(12) United States Patent
Shachrur

(10) Patent No.: US 12,484,772 B2
(45) Date of Patent: Dec. 2, 2025

(54) AIR SPECULUM

(71) Applicant: Ivy Diagnostics (2021) Ltd., Tel Aviv (IL)

(72) Inventor: Sefi Shachrur, Pardes Hana Karkur (IL)

(73) Assignee: Ivy Next Ltd., Caesarea Industrial Park (IL)

( * ) Notice: Subject to any disclaimer, the term of this patent is extended or adjusted under 35 U.S.C. 154(b) by 482 days.

(21) Appl. No.: 17/604,425

(22) PCT Filed: Apr. 17, 2020

(86) PCT No.: PCT/IB2020/053647
§ 371 (c)(1),
(2) Date: Oct. 17, 2021

(87) PCT Pub. No.: WO2020/212923
PCT Pub. Date: Oct. 22, 2020

(65) Prior Publication Data
US 2022/0218192 A1    Jul. 14, 2022

Related U.S. Application Data

(60) Provisional application No. 62/835,532, filed on Apr. 18, 2019.

(51) Int. Cl.
| | |
|---|---|
| A61B 1/32 | (2006.01) |
| A61B 1/015 | (2006.01) |
| A61B 1/018 | (2006.01) |
| A61B 1/06 | (2006.01) |
| A61B 1/303 | (2006.01) |

(52) U.S. Cl.
CPC ............... *A61B 1/32* (2013.01); *A61B 1/015* (2013.01); *A61B 1/018* (2013.01); *A61B 1/0661* (2013.01); *A61B 1/303* (2013.01); *A61B 2562/0247* (2013.01)

(58) Field of Classification Search
CPC .. A61B 1/32; A61B 1/05; A61B 1/661; A61B 17/02; A61B 1/303
See application file for complete search history.

(56) References Cited

U.S. PATENT DOCUMENTS

| | | | |
|---|---|---|---|
| 5,143,054 A | | 9/1992 | Adair |
| 5,716,329 A | * | 2/1998 | Dieter .................... A61B 1/303 600/184 |
| 6,447,444 B1 | * | 9/2002 | Avni .................. A61B 1/00151 600/129 |
| 10,098,691 B2 | * | 10/2018 | Long .................. A61B 18/1402 |

(Continued)

OTHER PUBLICATIONS

PCT Search Report and Written Opinion PCT/IB2020/053647, Aug. 7, 2020.

*Primary Examiner* — Julianna N Harvey
*Assistant Examiner* — Holly Joanna Lane
(74) *Attorney, Agent, or Firm* — Dekel Patent Ltd.; David Klein

(57) ABSTRACT

A speculum (10) includes a speculum sheath (12) formed with a first lumen (20) which is in fluid communication with a pump and controller unit (24) for introducing pressurized air into a vagina, a second lumen (26) in fluid communication with the pump and controller unit (24) for measuring air pressure in the vagina, and a third lumen (30) in which is disposed a viewing device (18).

11 Claims, 3 Drawing Sheets

(56) References Cited

U.S. PATENT DOCUMENTS

| | | | | |
|---|---|---|---|---|
| 10,433,717 B1* | 10/2019 | Truckai | ............ | A61B 1/00094 |
| 2006/0149129 A1* | 7/2006 | Watts | ................ | A61B 1/0125 |
| | | | | 600/113 |
| 2009/0036744 A1 | 2/2009 | Vayser | | |
| 2010/0094167 A1* | 4/2010 | Iinuma | .............. | A61B 10/0291 |
| | | | | 600/249 |
| 2017/0181607 A1* | 6/2017 | Lalli | ................ | A61B 1/00154 |
| 2019/0082948 A1 | 3/2019 | Ford | | |
| 2019/0159662 A1* | 5/2019 | Papas | ............... | A61B 1/00032 |

\* cited by examiner

AIR SPECULUM

FIELD OF THE INVENTION

The present invention relates to vaginal speculums and particularly to a vaginal speculum that uses pressurized air to maintain a passageway through the vagina, such as to gain access to the cervix or other anatomy.

BACKGROUND OF THE INVENTION

Vaginal speculums provide access to the vagina and cervix for physical examinations and for introducing surgical instruments, such as for collecting tissue samples or for introducing medications.

Inflatable vaginal speculums have been used to examine the vagina and cervix. However, prior art inflatable speculums require sealing the septum against the vaginal walls, such as with a watertight or airtight septum or plug placed at the distal end of the speculum. The seal is meant to prevent flow of fluid (water or air) from the vagina and at the same time permit pressurized flow into the vagina.

SUMMARY OF THE INVENTION

The present invention seeks to provide a novel air speculum, as described in detail below.

The inventive speculum provides all the functionality of prior art speculums. The speculum of the invention can be used for many procedures, such as but not limited to, vaginal and cervical general inspection, cervical biopsies (e.g., Pap smears), and as working port for vaginal, cervical and uterine surgical procedures.

Among the many benefits of the speculum are significant reduction in pain to the woman and better acceptance by women, since there is no discomfort or shame and the physician does not have to contact the intimate organs of the woman. The speculum enables examining and treating a greater area of the vaginal canal and cervix with higher resolution. Instruments such as hysteroscopes can be used without sterilization. There is significantly improved illumination to view and examine the vagina.

There is thus provided in accordance with a non-limiting embodiment of the present invention a speculum including a speculum sheath formed with a first lumen which is in fluid communication with a pump and controller unit for introducing pressurized air into a vagina, a second lumen in fluid communication with the pump and controller unit for measuring air pressure in the vagina, and a third lumen in which is disposed a viewing device.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1A:
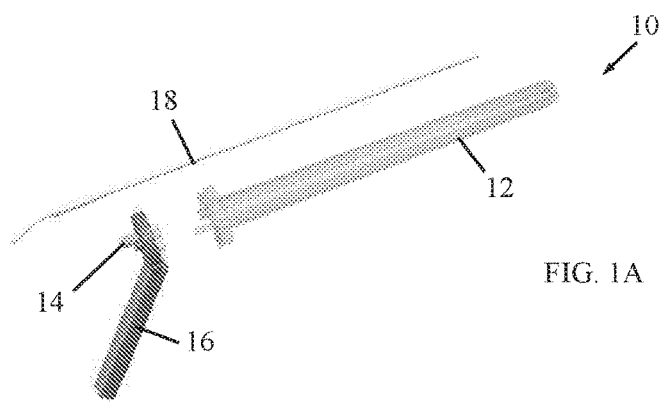
FIGS. 1A and 1B are simplified exploded and pictorial illustrations of an air speculum, constructed and operative in accordance with a non-limiting embodiment of the present invention.
Figure 1B:
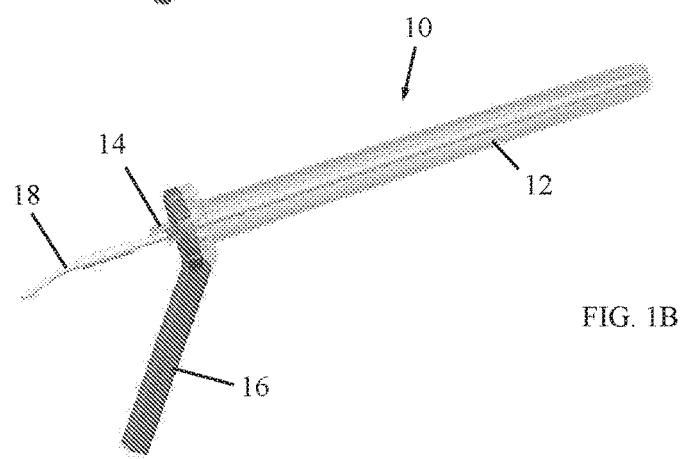

Reference is now made to FIGS. 1A and 1B, which illustrate an air speculum 10, constructed and operative in accordance with a non-limiting embodiment of the present invention.

Speculum 10 includes a speculum sheath 12, which may be disposable, which couples with a light source 14, mounted on a handle 16. A viewing device (camera) 18 is arranged to pass into speculum sheath 12.

Figure 2A:
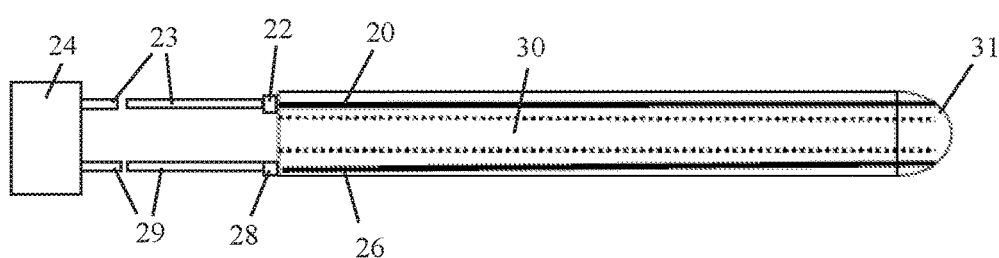
FIGS. 2A, 2B and 2C are simplified pictorial illustrations of a speculum sheath with lumens for introducing pressurized air, for measuring air pressure in the vagina, for placing a viewing device and a work channel for introducing tools, operative in accordance with a non-limiting embodiment of the present invention.

The structure of speculum sheath 12 is now described with reference to FIGS. 2A and 2B. The speculum sheath 12 may be made of a medically-safe flexible plastic (preferably transparent) and may be formed with several lumens. For example, a first lumen 20 may be in fluid communication via a fluid connector 22 and tubing 23 with a pump and controller unit 24 (described more in detail with reference to FIG. 4), for introducing pressurized air into the vagina. A second lumen 26 may be in fluid communication via a fluid connector 28 and tubing 29 with pump and controller unit 24, for measuring air pressure in the vagina. A third lumen 30 is provided for placing therein viewing device 18. The light source 14 may be coupled to third lumen 30. The third lumen 30 (camera channel) may be closed at its distal end with an optically clear lens 31 to prevent any contact of tissues or fluids with viewing device 18 and avoid the need to sterilize viewing device 18. The sheath protects the viewing device 18.

The viewing device 18 may be, without limitation, a small diameter tube camera (1.6 mm) with a very wide lens (120°), good resolution and USB connection. The light source 14 may be one or more LEDs located on the handle 16. With light guides (e.g., optical fibers), the light is directed to the distal end of the device to illuminate the vaginal channel. With a wide lens and appropriate lighting, the user sees a well-illuminated picture of the vagina channel, and may move the device back and forth for viewing desired areas.

Figure 2B:
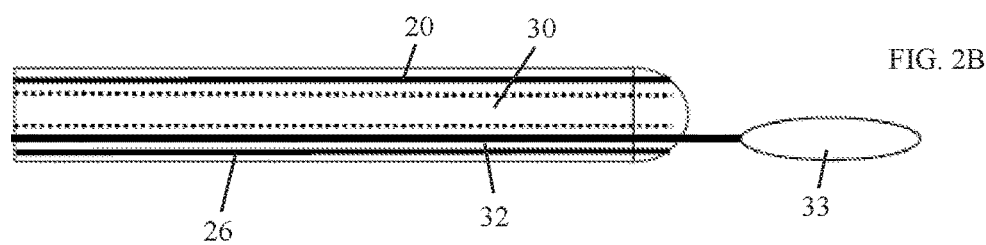
Figure 2C:
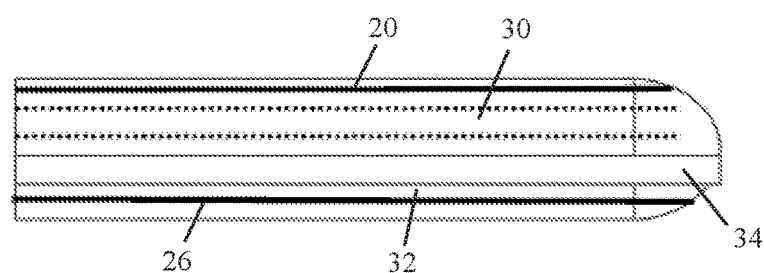

Optionally, as seen in FIGS. 2B and 2C, a fourth lumen 32 (work channel) may be provided for introducing a Pap smear brush 33 (FIG. 2B) or a tool 34 (FIG. 2C), such as but not limited to, biopsy tools, cutting incision tools, drug delivery tools and many other tools and devices.

The sizes, shapes and profiles of the air speculum and its lumens may be determined by different factors, such as but not limited to, a structure that minimizes or eliminates pain when inserting and using the device, and a structure that seals the entrance to the vagina as much as possible for efficient inflation and pressure measurement.

Figure 3A:
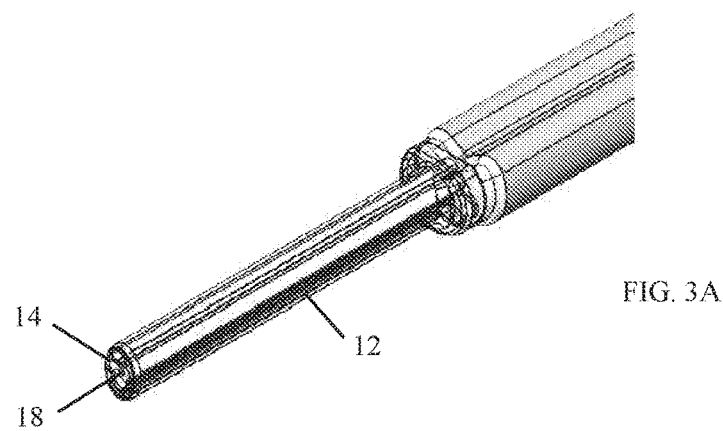
FIGS. 3A and 3B are simplified pictorial illustrations of other possible shapes and sizes for illumination and viewing device lumens of the speculum of the invention.
Figure 3B:
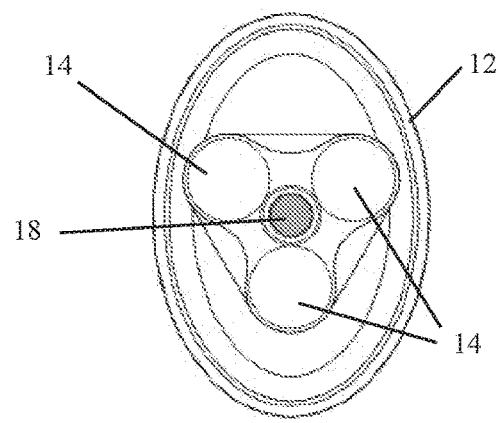

For example, as seen in FIGS. 3A and 3B, the speculum sheath 12 may be oval to better seal against the labia minora and/or labia majora of the vagina, or may have other possible shapes and sizes for accommodating other illumination and viewing device lumens and sealing structure against the female anatomy. The viewing device 18 may be central with more than one such light source 14 (such as three light sources 14) around the viewing device 18.

The device may be, without limitation, approximately 6 mm in diameter. The first lumen 20 may be used to inflate the vaginal canal up to 20 mmHg, without limitation. The inflation fluid may be air, $CO_2$ or nitrogen, for example. The second lumen 26 may be used to sense the real-time pressure in the vaginal tunnel to avoid pressure drops.

Figure 4:
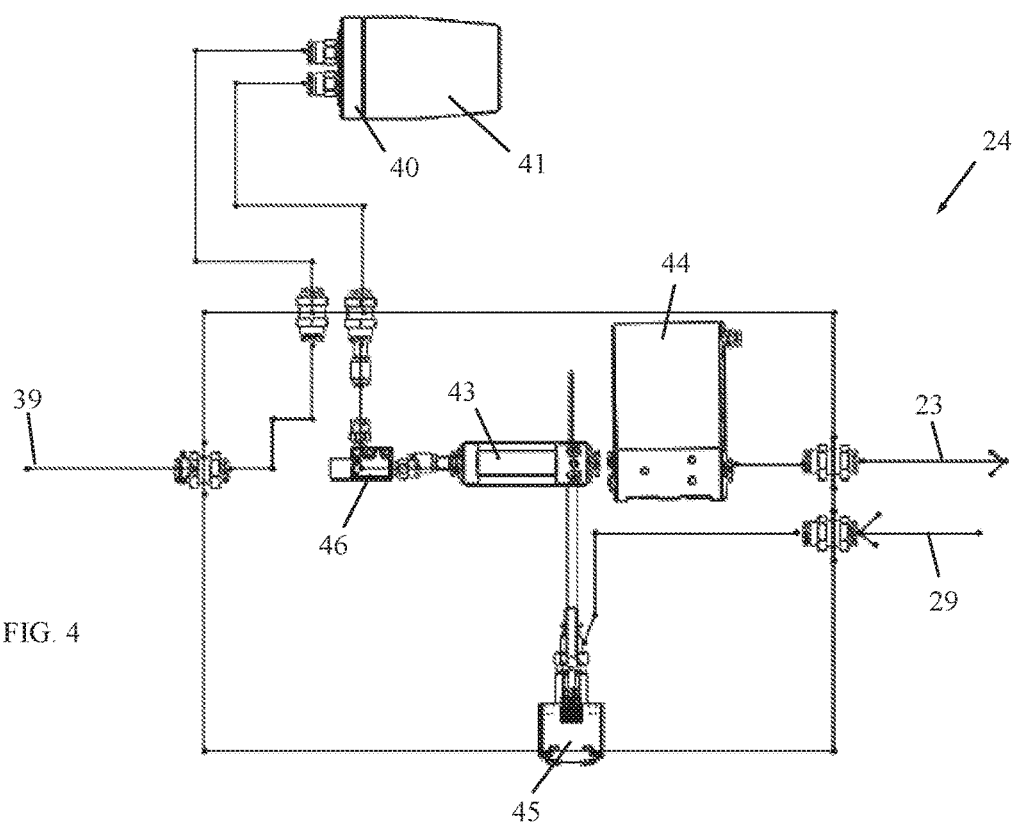
FIG. 4 is a simplified block diagram of a controller and pump for use with the speculum, in accordance with a non-limiting embodiment of the present invention.

Reference is now made to FIG. 4, which is a simplified block diagram of the pump and controller unit 24. Unit 24 may include, without limitation, a pump 40, which may be switched on and off by a switch 41, which may be foot-controlled. Pump 40 is coupled to a fluid inlet 39 and outputs pressurized fluid to a flow meter 43, via a pressure relief safety valve 46 for safety. The pressurized fluid flows from the flow meter 43 to the tubing 23 (connected to first lumen 20 as shown above in FIG. 2A), such as via a proportional flow control valve 44. As mentioned above, tubing 29 is used for measuring air pressure in the vagina. Tubing 29 may be coupled to a pressure sensor 45, which is coupled to flow meter 43. This provides feedback control for regulating the pressurized fluid supplied to the vagina.

Figure 5:
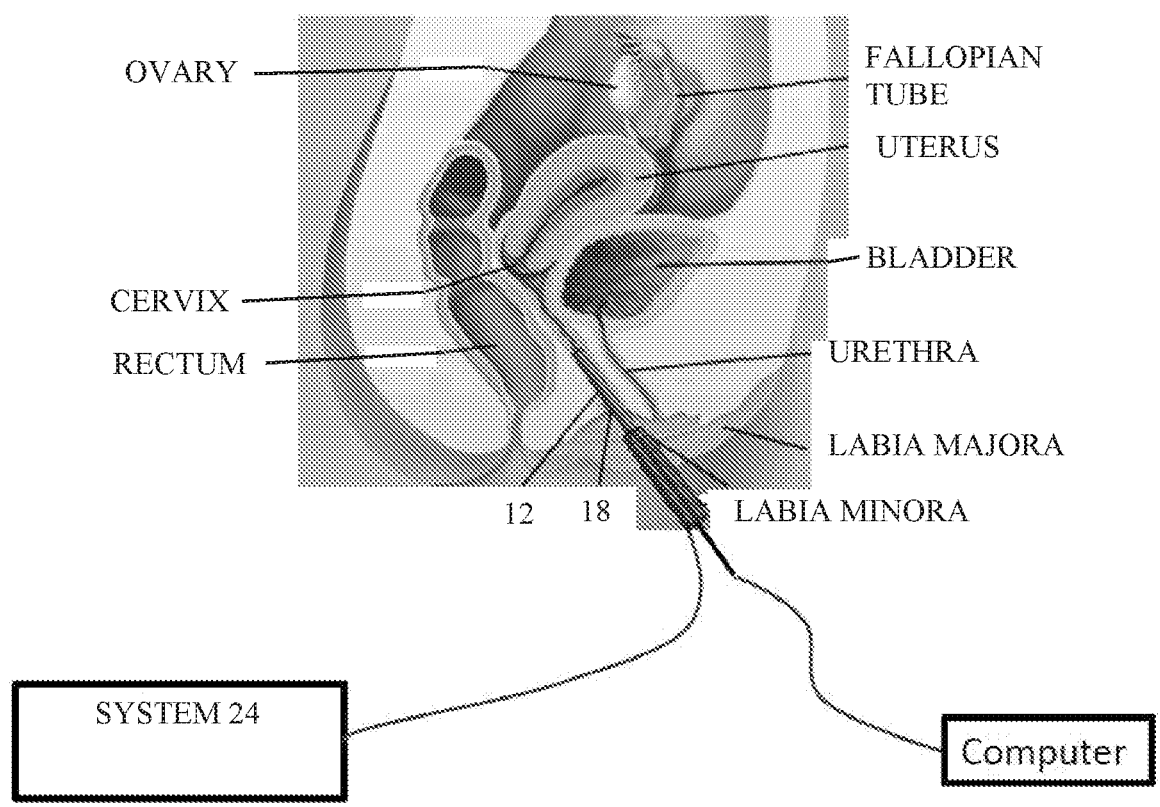
FIG. 5 is a simplified illustration of the speculum introduced in the vagina of a patient.

FIG. 5 is a simplified illustration of the speculum 10 introduced in the vagina of a patient.

In use, the speculum provides continuous flow control with no need for any vaginal plug. The pressure in the vaginal canal is continuously monitored and any drop in pressure can be compensated by pumping more air. Feasibility tests have shown that with no plug or seal, the speculum can maintain a pressure of approximately 15 mm/Hg in the vagina. Feasibility tests used ~18 mmHg to inflate the vagina and the pressure relief came into operation at 20 mmHg. To keep the vagina inflated, there was no need for a high flow rate.

What is claimed is:

1. A speculum comprising:
a speculum sheath formed with a first lumen which is in fluid communication with a pump and controller unit configured for introducing pressurized fluid into a vagina, a second lumen in fluid communication with said pump and controller unit for measuring fluid pressure in the vagina, and a third lumen in which is disposed a viewing device, and a sealing structure at a distal end of said speculum sheath that is configured to seal said first and second lumens from escape of said pressurized fluid when said sealing structure is pressed against female anatomy relative to the vagina so that said pressurized fluid enters the vagina for efficient inflation and pressure measurement, and wherein said pump and controller unit comprises a pump, a flow meter, and a pressure relief safety valve.

2. The speculum according to claim 1, further comprising a light source coupled to said speculum sheath.

3. The speculum according to claim 1, comprising a fourth lumen for introducing a tool therethrough.

4. The speculum according to claim 1, wherein said speculum sheath is oval shaped.

5. The speculum according to claim 1, wherein a plurality of light sources are placed around said viewing device.

6. The speculum according to claim 1, wherein said sealing structure comprises an oval shape of the distal end of said speculum sheath configured to seal against labia minora or labia majora of the vagina.

7. A speculum comprising:
a speculum sheath formed with a first lumen which is in fluid communication with a pump and controller unit configured for introducing pressurized fluid into a vagina, a second lumen in fluid communication with said pump and controller unit for measuring fluid pressure in the vagina, and a third lumen in which is disposed a viewing device, and a sealing structure at a distal end of said speculum sheath that is configured to seal said first and second lumens from escape of said pressurized fluid when said sealing structure is pressed against female anatomy relative to the vagina so that said pressurized fluid enters the vagina for efficient inflation and pressure measurement, wherein said pump and controller unit comprises a pressure sensor coupled to said pump and to said second lumen, wherein said pump and controller unit uses feedback from said pressure sensor to control said pump to supply the pressurized fluid.

8. The speculum according to claim 7, comprising a fourth lumen for introducing a tool therethrough.

9. The speculum according to claim 7, wherein said speculum sheath is oval shaped.

10. The speculum according to claim 7, wherein a plurality of light sources are placed around said viewing device.

11. The speculum according to claim 7, wherein said sealing structure comprises an oval shape of the distal end of said speculum sheath configured to seal against labia minora or labia majora of the vagina.

* * * * *